United States Patent
Colas et al.

(10) Patent No.: US 11,826,819 B2
(45) Date of Patent: Nov. 28, 2023

(54) PROCESS FOR MANUFACTURING A METAL PART

(71) Applicant: SAFRAN AIRCRAFT ENGINES, Paris (FR)

(72) Inventors: Cédric Pierre Jacques Colas, Moissy-Cramayel (FR); François Pichot, Moissy-Cramayel (FR); Hugo Sistach, Moissy-Cramayel (FR); Josserand Jacques André Bassery, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 40 days.

(21) Appl. No.: 17/623,994

(22) PCT Filed: Jul. 2, 2020

(86) PCT No.: PCT/FR2020/051161
§ 371 (c)(1),
(2) Date: Dec. 30, 2021

(87) PCT Pub. No.: WO2021/001633
PCT Pub. Date: Jan. 7, 2021

(65) Prior Publication Data
US 2022/0347740 A1 Nov. 3, 2022

(30) Foreign Application Priority Data

Jul. 3, 2019 (FR) ...................................... 1907388

(51) Int. Cl.
*B22C 9/04* (2006.01)
*B22C 9/22* (2006.01)
(Continued)

(52) U.S. Cl.
CPC ................ *B22C 9/043* (2013.01); *B22C 9/22* (2013.01); *B22D 19/04* (2013.01); *B22D 19/16* (2013.01); *B33Y 80/00* (2014.12)

(58) Field of Classification Search
CPC ........... B22C 9/043; B22C 9/22; B22D 19/04; B22D 19/16
See application file for complete search history.

(56) References Cited

U.S. PATENT DOCUMENTS

| 4,008,052 A | 2/1977 | Vishnevsky et al. |
| 2013/0330201 A1 | 12/2013 | Digard Brou De Cuissart et al. |

FOREIGN PATENT DOCUMENTS

| EP | 2 450 129 A2 | 5/2012 |
| WO | 2015017111 A1 | 2/2015 |

OTHER PUBLICATIONS

International Search Report dated Aug. 25, 2020, issued in corresponding International Application No. PCT/FR2020/051161, filed Jul. 2, 2020, 6 pages.

(Continued)

*Primary Examiner* — Kevin P Kerns
*Assistant Examiner* — Steven S Ha
(74) *Attorney, Agent, or Firm* — CHRISTENSEN O'CONNOR JOHNSON KINDNESS PLLC

(57) ABSTRACT

A process manufactures a metal part for a turbomachine that includes first and second metal materials with different chemical compositions. The process includes the steps of obtaining an element of which at least a first metallic part is made of the first metallic material and placing the element in a first mold and pouring wax into the mold to at least partially cover the element. The first mold has an impression corresponding to at least part of an external surface of the metal part. The process further includes obtaining an assembly by removing the first mold and making a shell mold with a first ceramic around the assembly. The process also
(Continued)

includes removing the wax from the shell mold and pouring the second metal material into the shell mold in place of the wax, and removing any ceramics present in the assembly.

10 Claims, 3 Drawing Sheets

(51) Int. Cl.
  *B22D 19/04* (2006.01)
  *B22D 19/16* (2006.01)
  *B33Y 80/00* (2015.01)

(56) References Cited

OTHER PUBLICATIONS

Written Opinion dated Aug. 25, 2020, issued in corresponding International Application No. PCT/FR2020/051161, filed Jul. 2, 2020, 5 pages.
English translation of Written Opinion dated Aug. 25, 2020, issued in corresponding International Application No. PCT/FR2020/051161, filed Jul. 2, 2020, 5 pages.
International Preliminary Report on Patentability dated Dec. 28, 2021, issued in corresponding International Application No. PCT/FR2020/051161, filed Jul. 2, 2020, 6 pages.

PROCESS FOR MANUFACTURING A METAL PART

FIELD OF THE DISCLOSURE

The present disclosure relates to the manufacture of turbomachine parts, such as blades, valves and casings.

BACKGROUND

In the field of turbomachines, current research is focused on improving and optimising the performance of turbomachines and their constituent subsystems. It is known that the performance of turbomachines depends in part on their operating temperature. In particular, a high turbine operating temperature has a significant impact on improving the efficiency of the turbomachine in its entirety.

However, in practice, the increase in operating temperature can only be achieved if the turbomachine's components are thermally and deformation resistant. For this purpose, it is known to produce blades with cavities forming a cooling air flow circuit from the upstream compressor.

The manufacture of blades with such cavities is typically done by investment casting. This technique, which is extensively described in FR2874186 on behalf of the applicant, involves making a wax model (or other equivalent provisional material) of the part to be moulded. The wax model is then subjected to successive dips in slip consisting of a suspension of ceramic particles to make a ceramic shell mould through so-called stuccoing and drying operations. The shell mould is then decanted, which consists of removing the wax or provisional material from the shell mould, usually by heating. Molten metal is then poured into the shell mould, which, after the metal has cooled, is broken mechanically to obtain the cast metal part.

In order to create the air circulation cavities inside the blade, it is necessary to incorporate one or more ceramic cores into the wax pattern, defining, after removal of the core(s), cavities forming channels for the circulation of a cooling-air flow.

This process makes it possible to obtain parts that are resistant to the operating temperatures of the turbomachine, and lighter, thanks to the design of the cavities, which also contributes to the optimisation of the turbomachine's operation.

However, this process is still limited, particularly with regard to the geometry of the cooling channels that can be produced. Their geometry remains globally simplified and limited by the technology used since the cores are also obtained by casting.

Also, this process does not allow the parts to be made any lighter, while maintaining the thermal and mechanical resistance required for the design of such parts.

In particular, the disclosure aims to provide a simple, effective and economical solution to the limitations of the prior art.

SUMMARY

The present disclosure relates firstly to a process for manufacturing a metallic turbomachines part comprising at least a first metallic material and at least a second metallic material, the chemical compositions of the first and second materials being different, the process comprises the following steps:
a) obtain an element of which at least a first metallic part is made by in the first metallic material;
b) place the element in a first mould and pouring wax into the mould to at least partially cover the element, the first mould having an impression corresponding to at least a part of an external surface of the metallic part;
c) obtain an assembly by removing the first mould;
d) make a shell mould with a first ceramic around the assembly obtained in step c);
e) remove the wax from the shell mould and casting the second metal material inside the shell mould in place of the wax;
f) remove any ceramic present in the assembly obtained in step
e) so as to obtain a metal part comprising the first metal material and the second metal material.

The interest of this process is to obtain a part with a metallic composite structure, i.e. comprising two different metals, associated in such a way as to lighten the parts obtained, for example, or, by judicious choice of the pairs of metals, to functionalize the parts of the parts created by using different metals for the internal structure of the part, and different metals for the external structure of the part.

This makes it possible to strengthen or reduce the thermal and/or mechanical resistance of certain parts of the part, or to lighten it while respecting the design requirements for mechanical and/or thermal resistance.

The element can be manufactured by additive manufacturing such as selective laser sintering, selective laser melting, laser metal deposition or powder metallurgy such as the powder metal injection moulding process.

The element may comprise at least one second ceramic portion in contact with the first portion of the element.

The use of an element comprising two parts, a metal part, intended to remain in the final part, and a ceramic part intended to be removed to obtain the final part, makes it possible to give the element a dual function in this process for making parts.

As mentioned above, the metal part makes it possible to produce bimetallic parts, in order to make the most of the advantages of the metals, depending on their arrangement in the structure of the part.

The ceramic part allows the creation of cavities in the internal structure of the part. These cavities can have different arrangements:
 inter-metal: this cavity can be located between the two metals used for the design of the part;
 intra-metal: this cavity can be located within one of the metals constituting the part.

These cavities, when they are open at the level of the external surface of the part obtained at the end of the process according to the disclosure, make it possible to cool the latter by the circulation of air in the cavities.

The second ceramic part of the element can be made by:
 place the first metal part of the element at least partly in a second mould; and
 fill the second mould with a second ceramic.

Such an arrangement of the element in the mould makes it possible to create an inter-metal cavity between the first metal, which constitutes part of the element, and the second metal. By only partially covering the element, the part comprises an interface between the first metal and the second metal which are in contact with each other. This interface allows the joining of the metal parts of the part.

The first metal part of the element may comprise at least one cavity in fluid communication with the exterior.

Thus, as mentioned previously, this cavity, when kept empty in the final part, allows the part to be cooled during its use by the circulation of air inside it. It can also be filled with the second metallic material so as to obtain a bimetallic element.

Step b) can be preceded by the following step:
at least partially fill the at least one cavity of the element with the second ceramic.

If it is desired to keep the cavity empty in the final part, then a second ceramic is used to prevent the second metal from entering the cavity during the casting process. The removal of this second ceramic in step f) leaves the cavity inside the part which can be open on the surface of the final part.

The removal of at least one of the first ceramic and the second ceramic can be achieved by chemical dissolution.

The first and second ceramics can have the same chemical composition.

In particular, this allows the removal of all the ceramics present in the structure to be carried out, for example, in one go by chemical dissolution.

The first metallic material can be a metal and/or an alloy. Also, the second metallic material can be a metal and/or an alloy.

For example, the first and second materials can be selected from the following materials: Titanium (can be low oxygen), TiAl (more or less loaded with aluminium or titanium), Refractory Nickel, Aluminium, Copper, Nickel based alloy, Cobalt based alloy.

The first metal part of the element can comprise a lattice structure.

The lattice structure, obtained by any suitable manufacturing technique, can then be made to have a more complex cavity structure than is currently realised, such as a network of cooling channels. A lattice structure also provides better mechanical properties while making the part lighter, especially by choosing a first material that is lighter than the second material.

The term "lattice" means a lattice structure which is an assembly of interlocking metal segments linked together to form a rigid unit.

The metal part can be a turbomachine blade.

The disclosure will be better understood and other details, characteristics and advantages of the disclosure will appear when reading the following description, which is given as a non-limiting example, with reference to the attached drawings.

DETAILED DESCRIPTION

Figure 1:
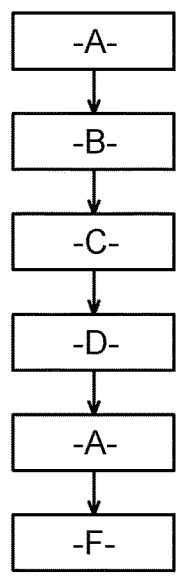
FIG. 1 is a flow chart representing steps of the process according to the disclosure.

FIG. 1 is a flow chart showing the process according to the disclosure.

The process according to the disclosure aims to produce a metal turbomachine part, such as a turbomachine blade.

In particular, the process makes it possible to make metal parts comprising a first metal material and at least one second metal material with the same or a different chemical composition as the first material. Of course, it is possible to make a part with more than two metallic materials, as per the process described here.

The first step A of the process consists in obtaining an element 2 of which at least a first metallic part 4 is made of the first metallic material. The element can be made using any suitable technique. For example, where the element is solid or has a simple shape, it can be possible to manufacture it by casting.

Figure 2:
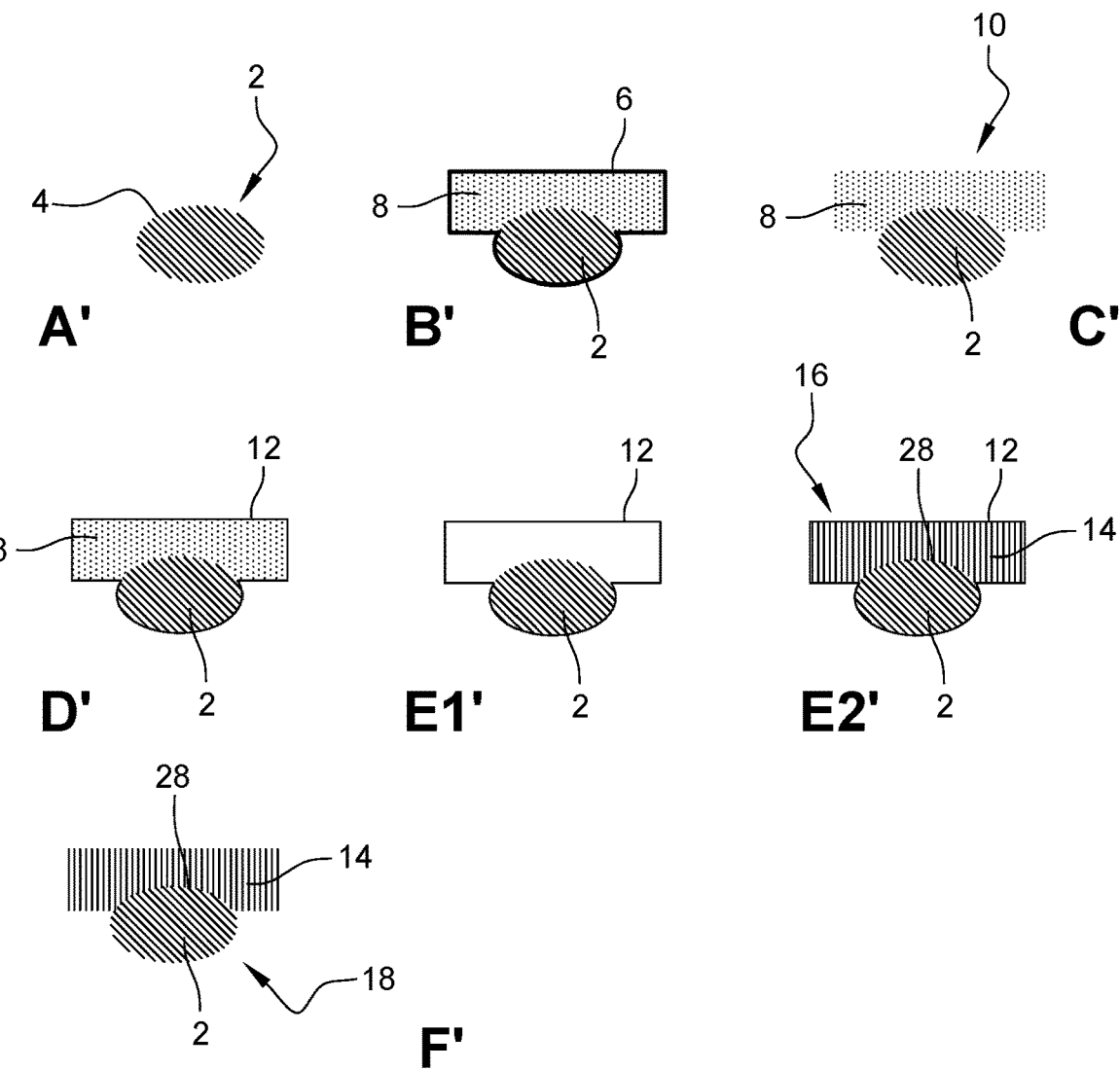
FIG. 2 is a diagram illustrating a first embodiment of the process according to the disclosure.

Step A in FIG. 2 illustrates an example of an element 2 made in a first embodiment. Element 2 is made entirely of the first metallic material and is solid. It can be obtained by three-dimensional printing, i.e. by additive manufacturing.

The second step B of the process comprises placing the element 2 in a first mould 6 and casting wax 8 into the mould to at least partially cover the element 2, the first mould 6 having an impression corresponding to at least part of an outer surface of the metal part. As can be seen in step B' of FIG. 2, the wax 8 covers at least part of the element 2 arranged integrally in the first mould 6. The first mould 6, having the internal shape, i.e. an impression, of the desired final part, is a conventional mould as used in the lost wax or plastic injection process.

It is of course possible that the wax 8 covers the entire surface of the element 2. For this purpose, it is necessary to provide retaining or supporting means to hold the element 2 in a predetermined position in the first mould 6, during the casting of the wax in the first mould 6. The third step C of the process consists in obtaining an assembly 10 by removing the first mould 6. As can be seen in step C' of FIG. 2, the resulting assembly 10 comprises the metal element 2 and the wax 8, the outer surface of which corresponds to the outer surface of the part to be manufactured.

The fourth step D of the process aims at making a shell mould 12 with a first ceramic around the assembly 10 obtained in step c).

For this purpose, the assembly 10 obtained is dipped several times in slip consisting of suspensions of ceramic particles constituting the first ceramic, to make the shell mould 12 by stuccoing and drying operations. Step D' in FIG. 2 illustrates the formation of the shell mould 12 on the outer surface of the resulting assembly 10.

The fifth step E' consists of removing the wax 8 from the shell mould 12 and casting the second metallic material inside the shell mould 12 in place of the wax 8.

Thus, as illustrated in step E1' of FIG. 2, the shell mould 12 of the workpiece is dewaxed. Dewaxing is an operation in which the wax 8 around which the shell mould 12 has been partly made, is removed from the shell mould 12. After removal of the wax 8, a shell mould 12 is obtained, the inner side of which, formed after removal of the wax, reproduces the outer side of the final part to be manufactured.

The resulting ceramic shell mould 12 encloses the element 2 made of the first metallic material. It then undergoes a high temperature heat treatment or "firing" to give it the mechanical properties required for casting the second metal material 14. The internal and external integrity of the resulting shell mould 12 is checked.

Thus, the second metallic material 14 is cast inside the shell mould 12, in place of the wax 8, as shown in FIG. 2 at step E'2, to obtain the desired final part.

To do this, the molten second metal material 14 is poured into the mould 12 so as to fill the gaps between the inner walls and the element 2 made of the second metal material 14. After the second metal material 14 has been cast, the sixth step F consists of removing any ceramic present in the assembly 16 obtained after the fifth step E so as to obtain a metal part 18 comprising the first metal material and the second metal material 14.

Figure 3:
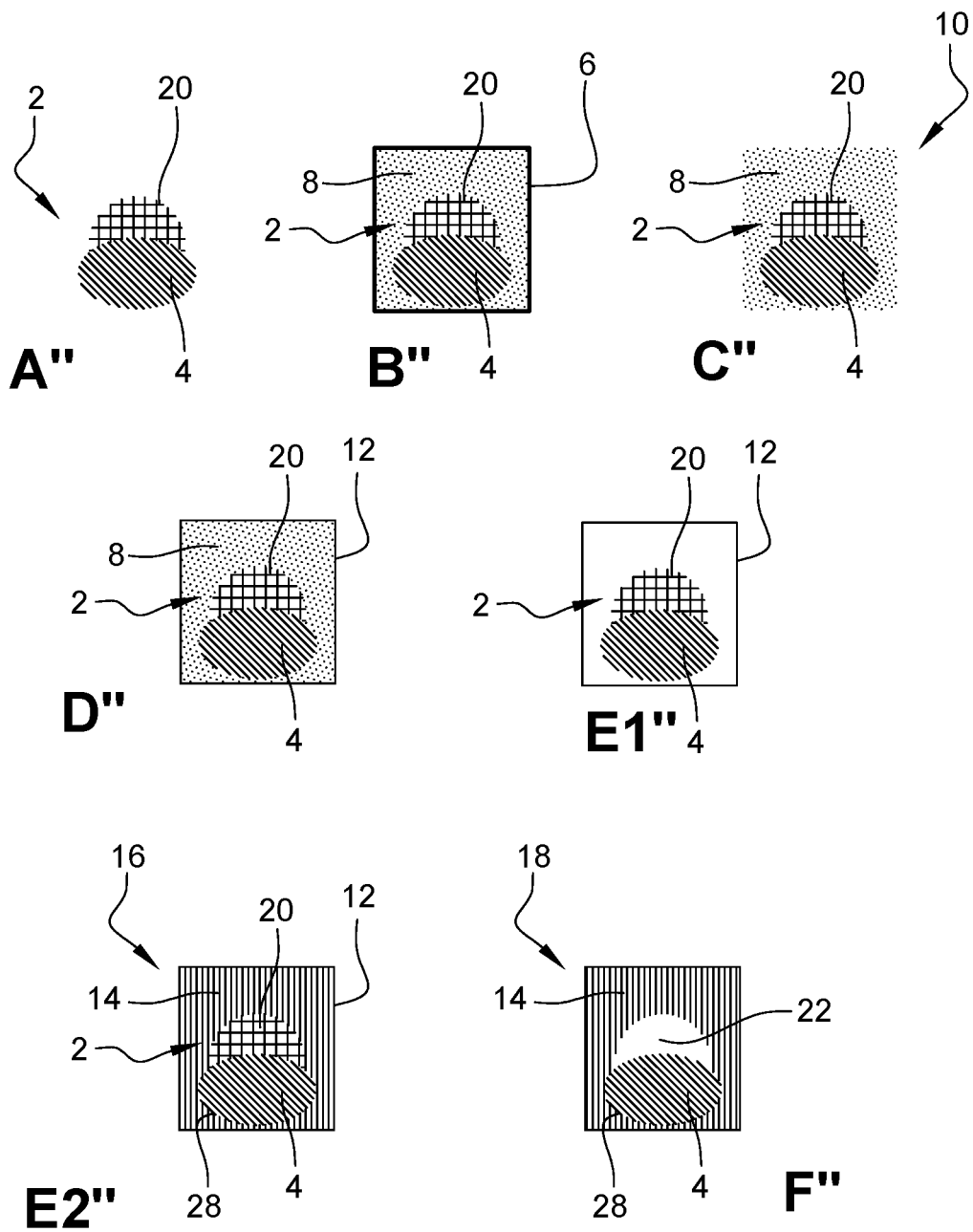
FIG. 3 is a diagram illustrating a first embodiment of the process according to the disclosure.

In the embodiment shown in FIG. 2, the only ceramic present in the assembly 16 obtained at the end of the fifth step E is the ceramic of the shell mould 12. In this case, the removal of the shell mould may consist, for example, in breaking it by a stripping operation. The resulting assembly 18, shown in step F' of FIG. 2, is then the final part. The latter is made of two metallic materials and can therefore be described as a metal composite. Thus, when producing a turbomachine blade for example, the mechanical and thermal strength requirements being distinct for the parts forming the outer part of the blade and the inner part of the blade, this process must be used to produce the part in at least two distinct materials, judiciously chosen with regard to the strength requirements of the different parts. FIG. 3 illustrates a second embodiment of the disclosure.

In this embodiment, the element 2 comprises a second ceramic part 20 in contact with the first portion 4 of the element 2.

Thus, the element 2 used comprises two parts: a first part 4 made of a first metallic material and a second part 20 made of ceramic. An example of element 2 is illustrated in step A' of FIG. 3.

To manufacture such an element 2, following the manufacture of the first metallic part 4 of the component 2, for example by additive manufacturing, the production of the second ceramic part 20 of the component 2 consists of:
  place the first metal part 4 of the element 2 at least partly in a second mould; and
  fill the second mould with a second ceramic.

Thus, a second ceramic is cast at least partly around the first part 4 of the element 2 made of the first metallic material. The second ceramic 20 used can have a different chemical composition than the first ceramic, or the same chemical composition.

The shape of the ceramic part of the element 2 corresponds to the impression of the second mould, i.e. the inner shape of the second mould. Once the ceramic has been cast, the element 2, consisting of the ceramic part 20 and the part 4 in the first metallic material, is demoulded, i.e. removed from the mould.

The following steps of the process of this second embodiment are identical to steps two to five of the embodiment shown with reference to FIG. 2.

As can be seen in FIG. 3, in step B", in the second step, the element 2 is placed in a first mould 6, and is held stationary therein during the pouring of the wax 8 into the first mould 6.

The first mould 6 is then removed, resulting in the assembly 10 shown in step C", comprising the element 2 and the wax 8.

Then, in a fourth step, a shell mould 12 is made with the first ceramic, as detailed above, around the resulting assembly 10, as seen in step D. Then, in a fifth step, as illustrated in steps E1" and E2", the wax 8 is removed from the shell mould 12 and is replaced, by casting, by the molten second metallic material 14.

The part 18 is obtained following the removal of any ceramics present in the assembly 16 obtained at the end of the fifth step E as illustrated in FIGURE F. Unlike the first embodiment, the assembly 16 of the second embodiment comprises two ceramics: a first ceramic constituting the shell mould 12 and a second ceramic 20 constituting the element 2.

Thus, in the sixth step of the process of this second embodiment, the first and second ceramics are removed from the assembly obtained at the end of the fifth step.

The removal of these two ceramics can be delayed or simultaneous. Also, the removal of one or both of these ceramics can be achieved by chemical dissolution. For this purpose, the assembly 16 illustrated in step E2" is immersed in a chemical bath, comprising for example caustic soda or any other chemical compound suitable for dissolving ceramics.

Removal of the second ceramic allows the creation of a cavity 22 in the part 18, as seen in FIGURE F.

Figure 4:
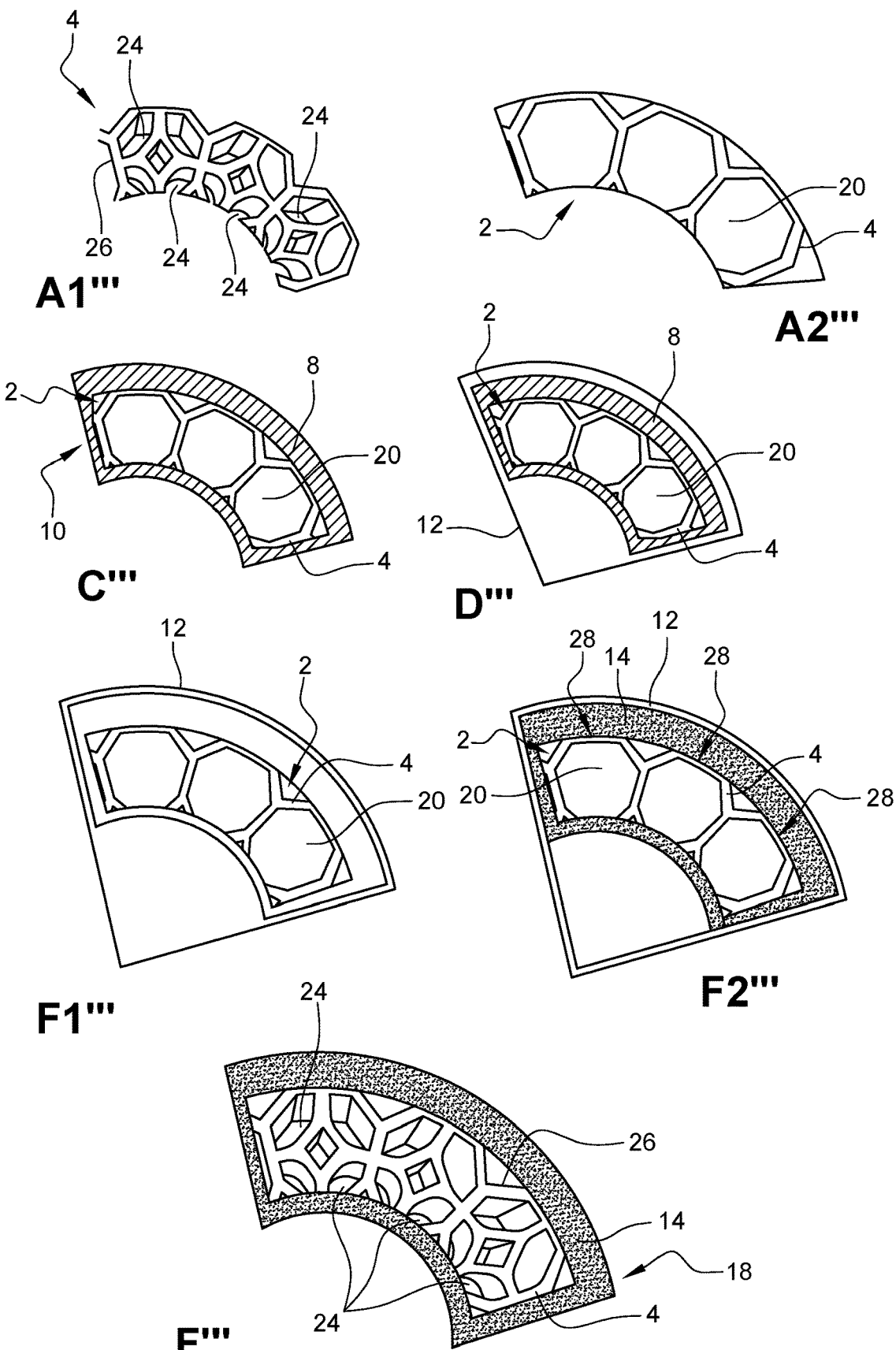
FIG. 4 is a diagram illustrating a first embodiment of the process according to the disclosure.

In a third embodiment, illustrated in FIG. 4, the first metal part 4 of the element 2 comprises cavities 24, which may also be called gaps, in fluid communication with the outside. In particular, as can be seen in FIG. 4 at step A1", the metal part comprises a lattice structure 26, obtained by additive manufacturing (or three-dimensional printing). Such a structure 26 allows the part 18 to be lighter while providing better mechanical properties. Also, in this way, the lattice structure 26 of the first metal part can form a cooling network increasing the heat exchange surface compared to the cooling circuits of the previous technique.

The lattice structure 26 of the first metal part 4 of the element 2 is a lattice structure, corresponding to an assembly of interlocking metal segments held together to form a rigid assembly.

Thus, in the third embodiment, following the obtaining of the first part 4 of the element 2 by additive manufacturing, the second part 20 of the ceramic element 2 is made. To this end, the element 2 is obtained, as illustrated in step AZ" of FIG. 4, by at least partially filling the cavities 24 of the element 2 with the second ceramic. For this purpose, the first part 4 consisting of a lattice structure 26 can be placed in a mould, where the second ceramic is then cast, so as to fill the cavities 24 delimited by the segments of the lattice structure 26.

Once the element 2 has been obtained, the following steps of the process according to this third embodiment are identical to steps two to six of the second embodiment described with reference to FIG. 3.

It is important to note that the cavities 24 are throughgoing, when the removal of the ceramics, in particular the second ceramic, is done by chemical bath.

Also, in order to enable a bond to be formed between the two metallic materials, it is important to ensure that when the second ceramic part 20 of the element 2 is made, it does not completely cover the outer surface of the first metallic part 4 of the element 2. Thus, when the molten second metal material 14 is poured into the shell mould 12, it comes into contact with the first metal material of the element 2. The points, surfaces and contact areas 28 are thus indicated in FIGS. 2, 3 and 4. These are the junctions between the first metallic material and the second metallic material 14.

In another embodiment, it is possible to dispense with the second ceramic and to cast the molten second metallic material 14 into the interstices 24 of the lattice structure 26. For this purpose, it is important to ensure that the melting point of the first metallic material is higher than the melting point of the second metallic material 14.

The first metallic material and the second metallic material used are metals and/or alloys. Several pairs of first and second metallic materials are possible, such as the following pairs:
  the first metallic material constituting part of the element (2) can be a nickel-based alloy and the second metallic material can be titanium. Titanium makes the part 18 lighter. The nickel base ensures the mechanical strength of the part 18. This pair of materials can be used, for example, for the manufacture of compressor centre stage blades.

the first metallic material constituting part of the element 2 can be Titanium and the second metallic material can be low-oxygen Titanium, a more ductile and less resistant material. This specific structure allows the internal titanium structure to take up the stresses while reducing the risk of cracking on the external structure, made of low-oxygen titanium, which is more ductile. This structure can be used to make the blades of the first compressor stages.

the first metallic material constituting part of the element 2 can be TiAl filled with Titanium and the second metallic material can be TiAl filled with Aluminium, a more ductile and less resistant material. This specific structure allows to take the stresses thanks to the internal structure in TiAl filled with Titanium while reducing the risks of cracking on the external structure, TiAl filled with Aluminium, which is more ductile. This structure can be used to make the blades of the first compressor stages.

the first metallic material constituting part of the element 2 can be refractory nickel and the second metallic material can be a cobalt-based alloy. This specific structure ensures good load carrying capacity in the central part of the refractory nickel and good corrosion resistance in the periphery in a cobalt-based alloy. This structure can be used to make the blades of the first stages of a low pressure turbine.

the first metallic material constituting part of the element 2 can be Titanium and the second metallic material can be Aluminium or Copper. This specific structure ensures good load carrying capacity in the central part of the Titanium and good heat exchange in the periphery in Aluminium or Copper. This structure can be used to make the blades of the first compressor stages.

The final part 18 can be obtained following a machining operation of the assembly 16 obtained at the end of the sixth step of the process according to disclosure.

The invention claimed is:

1. A process for manufacturing a metal turbomachine part comprising a first metal material having a first chemical composition and a second metal material having a second chemical composition different than the first chemical composition, the process comprising the steps of:
   a) obtaining an element of which at least a first metal part is made of the first metal material;
   b) placing the element in a first mold and pouring wax in the mold to at least partially cover said element, the first mold having an impression corresponding to at least part of an external surface of the metal turbomachine part;
   c) obtaining an assembly by removing said first mold;
   d) making a shell mold with a first ceramic around the assembly obtained in step c);
   e) removing the wax from said shell mold and casting the second metal material inside the shell mold in place of the wax; and
   f) removing any ceramic present in an assembly obtained after step e) so as to obtain the metal turbomachine part comprising the first metal material and the second metal material.

2. The process according to claim 1, wherein the element comprises at least one second ceramic part comprising a second ceramic, the at least one second ceramic part being in contact with the first metal part of the element.

3. The process according to claim 2, wherein making the at least one second ceramic part of the element consists of the steps of:
   placing the first metal part of the element at least partly in a second mold; and
   filling the second mold with the second ceramic.

4. The process according to claim 2, wherein the first metal part of the element comprises at least one cavity in fluid communication with an outside of the metal turbomachine part, and wherein step b) is preceded by the step of:
   at least partially filling the at least one cavity of the element with the second ceramic of the at least one second ceramic part.

5. The process according to claim 2, wherein the removal of at least one of the first ceramic of the shell mold and the second ceramic of the at least one second ceramic part is achieved by chemical dissolution.

6. The process according to claim 2, wherein the first ceramic of the shell mold and the second ceramic of the at least one second ceramic part have the same chemical composition.

7. The process according to claim 1, wherein the first metal part of the element comprises at least one cavity in fluid communication with an outside of the metal turbomachine part.

8. The process according to claim 1, wherein the first metal material and the second metal material are metals and/or alloys.

9. The process according to claim 1, wherein the first metal part of the element comprises a lattice structure.

10. The process according to claim 1, wherein the metal turbomachine part is a turbomachine blade.

* * * * *